3,310,909
SOIL TREATMENT PROCESS
Donald Alfred Bennett, Beaulieu, England, assignor to The International Synthetic Rubber Company Limited, Southampton, England, a corporation of the United Kingdom
No Drawing. Continuation of application Ser. No. 341,768, Jan. 31, 1964. This application Mar. 11, 1966, Ser. No. 533,731
Claims priority, application Great Britain, Feb. 6, 1963, 4,836/63
6 Claims. (Cl. 47—9)

This application is a continuation of application Ser. No. 341,768, filed Jan. 31, 1964, and now abandoned.

The present invention relates to the use of an oil extended rubber latex for the treatment of the soil surface with particular reference to combating erosion and improving the soil texture.

Soil erosion is a phenomenon occurring in a wide variety of situations. It is accelerated by the action of wind and of rain and is worse in conditions of poor soil coherence. In desert areas sand blown by the wind interferes with all forms of transport and surface navigation. The loose surface is scuffed by the wind and seeds of plants that might otherwise germinate are disturbed. In like fashion streams of water formed in rain storms on less pervious soils carry away the surface and can eventually undermine appreciable areas of soils and crops within a short time.

Even in temperate climates, where soils are moist, surface-caking of clays and silts, which results from initial wetting followed by drying out in hot sunshine, can interfere with the exchange of soil gases and vapours with the air. This phenomenon is known as soil capping.

In the making of cuttings, embankments, or culverts large areas of steeply sloping bare soil are exposed to the weather. Unstable soils require considerable attention before a thriving plant community can be established.

It is also desirable to protect the surface of stocks of mineral materials such as coal, or iron ore and the surfaces of waste material from mineral workings and of ash from coal-burning power stations to prevent loss by wind blowing and rain erosion which are both a nuisance and a potential source of serious loss of material.

Processes for overcoming these problems include the laying of dust by water, and the spraying of steeply sloping sides of new cuttings with bitumen emulsions which are unpleasant to handle and which give unsightly deposits. Sand dunes especially in coastal areas have been planted with marram grass which gives a first class permanent anchorage of the sand, but much difficulty has been encountered in obtaining adequate germination of the grass because of wind and water erosion.

Ploughing in of farmyard manure and straw, as a soil stabilisation procedure, is time consuming and may be difficult in inaccessible areas. Its stabilising action on soil takes a long time to develop. Its expense justifies its use only on land that can maintain a food crop.

One process proposed for soil treatment is that of spraying the surface of the soil with oil. However, this method has the serious disadvantage that little or no coherent film is produced. The amount of stabilisation obtained is minimal and furthermore the oil treated areas remain sticky for long periods.

British specification No. 910,974 on the other hand discloses the use of a rubber latex to which no oil has been added. This process whilst giving effective stabilisation of soil surface layers is expensive and needs the addition of a "counter penetrant" in order to give the film the correct degree of porosity.

An object of the present invention is to provide an improved method of treating soil and like surfaces to prevent erosion by wind and rain and to improve the texture thereof.

It is known in the rubber industry to add mineral oils to natural and synthetic rubber to obtain products at reduced cost and with modified properties. We have found that by using an oil extended latex, i.e. in the presence of both rubber and oil, we can achieve a suitable degree of soil stabilisation at reasonable cost.

The present invention provides a process for treating a soil or other particulate material surface, comprising applying to the surface a latex of an oil extended (as hereinafter defined) natural or synthetic rubber. Preferably the latex is applied to the soil surface by spraying.

The term "oil extended rubber," as used herein, means the product obtained by mixing natural or synthetic rubber with a compatible oil such that the oil is absorbed by the rubber. The ratio of oil to rubber and the type of emulsifying agent present can be adjusted to suit any soil aggregate. The oil may be mixed directly with the rubber in dry crumb form or an oil emulsion may be mixed with rubber latex. These are two examples of techniques for combining rubber and oil and there are a number of other ones; the present invention is not limited to an oil extended rubber produced by a particular mixing, compounding or combining technique.

The oils which can be employed may be colourless highly refined mineral oils where very light coloured films are required or they may be dark, relatively crude or even bitumen-containing oils where cost is the prime factor and where a dark area is desired in order to increase heat absorption.

In practice, the preferred oils are mineral oils. Aromatic and naphthenic oils are particularly effective but many fuel and lubricating oils are equally satisfactory. In the present invention the amount of oil is in the range 50–1000 parts of oil by weight per 100 parts of rubber, but other proportions of rubber and oil may be found to be satisfactory. Particularly satisfactory proportions are 9 parts of mineral oil to 1 part by weight of rubber.

An example of a suitable synthetic rubber is a general purpose styrene-butadiene rubber which has a combined styrene content of 23% with a butadiene content of 77%. Synthetic rubbers having other ratios of styrene to butadiene can be used. Both styrene and butadiene can be replaced by other monomers without disadvantage, for example, copolymers prepared from acrylonitrile and isobutylene may be used. The use of high styrene content copolymers extended by the addition of oil is particularly advantageous since the polymers are very brittle in the absence of oil. The process according to the present invention may be practised with oil extended homopolymers of butadiene or styrene.

The spraying of a latex of an oil extended natural or synthetic rubber onto a soil or like surface produces a film or blanket which becomes more permanent after evaporation of the water. This film or blanket adheres to the soil particles. Depending upon the solids content of the latex and/or the amount of latex applied, the film may be substantially continuous and may be either impermeable or porous to moisture.

The presence of oil increases the permanence and flexibility of the rubbery film. Films of pure oil remain very tacky but when rubber is present there is virtually only sufficient tackiness to give a coherent film which bonds well to soil particles. The oil content enables a superior film of rubber to be formed which has improved water resistance but can be deposited in such a way that its porosity to rain water can be predetermined.

The uses of the process of the invention are very varied. By spraying a sandy area with oil extended rubber latex a flexible film can be produced as a means of halting the growth of "blow outs" caused by wind erosion. The film should be of such a flexibility as to accommodate natural changes in the shape of the soil surface but at the same time have the power to bind sand grains into a skin. When used in such a way the film may also act as an aid to re-colonisation of vegetation, there being no adverse effects on germination or emergence of seeds, for example, lettuce, onion, turnip, pea, bean and grass seeds. The film should usually have permeability to rain water to permit germination or continued growth of plants already present in the soil. In other instances, impermeability to water but diffusion to gases is required. Such conditions are controlled by a suitable choice of viscosity and solids concentration and formulation of the oil extended rubber latex, the soil moisture content and the rate of application of the latex.

The rate of application of a 9:1 parts by weight ratio of oil to rubber latex may be about 40–50 grams per square metre but amounts up to 300 grams per square metre and more can be used if desired.

Synthetic rubber latices generally contain water soluble emulsifiers, buffers and other compounds which may contribute significantly to the nutrient status of the treated soil through drainage or evaporation of the aqueous phase when the emulsion has broken.

Non-ionic stabilisers may be included in the water before emulsification of the oil to prevent separation of the oil on long standing. Suitable emulsifiers are non-ionic emulsifiers, such as casein and Texofor FX51. Texofor FX51 is an alkyl phenol, ethylene oxide condensate manufactured by Glovers (Chemicals) Ltd., Leeds. The water phase is a convenient vehicle for other plant nutrients which stimulate the growth of vegetation.

Oil extended rubber latex has been found to be a suitable vehicle for oil-soluble pesticides and for fillers such as carbon black, chalk, china clay, flue ash and other conditioners and colourisers. By pesticides we mean to include both insecticides, and fungicides. By suitable choice of dark or light coloured oils a greater or lesser heat absorbing effect on the treated soil can be achieved. Water soluble weed-killers can also be used.

The latex may be used in deserts and on soils which have been deprived of organic matter due to overcropping.

Certain types of soil can be cultivated to a good tilth for sowing but suffer breakdown of structure during rain. This results in the surface becoming hard, flat and relatively impervious to gases, water vapour and rain. It is known as soil capping and hinders healthy plant growth. A susceptible soil can be cultivated, sown and then sprayed with the latex mixture to form a binding film around the particles on the top layer of soil. This reduces the effects of raindrop impact and preserves the open porous texture, allowing water and air to penetrate freely to seeds and plant roots.

An extension of the idea of soil stabilisation is applicable to stocks of mineral materials, such as coal and iron ore, and also to waste mineral matter such as furnace ash. A skin of oil extended rubber latex sprayed onto these materials will give protection from loss by wind blowing and from erosion by rain.

Oil extended rubber latices of the types hereinbefore mentioned are relatively cheap and readily available.

It will be appreciated that the greater the proportion of oil in total "solids," the cheaper is the latex and hence, the treatment of the soil and the like surface to prevent erosion and improve the texture thereof.

The latex can be sprayed using standard knapsack sprayers but the most economical and efficient way of applying the compound in bulk is by the use of helicopters or other light aircraft suitably adapted to deal with a rate of application of up to at least 60 grams per square metre. The latex is both stable in transit and easily pumped by most standard equipment.

Brass nozzles can be utilized for accuracy in continuous spraying of up to 400 hours.

When the contours of the land are such that small dunes and depressions occur in close proximity to each other, thus providing a possible aerial spray trap, then tractor spraying is recommended.

An oil emulsion of 50% solids content was used for the examples given below and was prepared as follows: 88 parts by weight of oleic acid were mixed with 1,000 parts of oil Sundex 1585 (Sun Oil Company) and heated to 60° C. 20 parts of potassium hydroxide were dissolved in 892 parts water. The warm oil was then poured into the potassium hydroxide solution at the vortex created by a turbo-type stirrer to produce an emulsion which was found to be stable for several days and could be blended in any desired proportion with a rubber latex. To prevent the separation of the suspended oil phase on long standing, 20 parts of Texofor FX51 (provided as a nonionic stabiliser) may be dissolved in the water before emulsification.

*Example 1*

An oil extended rubber latex, spray compound made up from latex of Intol 1570 rubber and aromatic oil in equal proportions, measured on a dry weight basis, was prepared at a solids content of 5%. Intol is a registered trademark of the International Synthetic Rubber Company Limited and Intol 1570 is a styrene butadiene synthetic rubber, the copolymer of which contains approximately 23.5% styrene and 76.5% butadiene. The rubber in the latex has a Mooney viscosity of approximately 125 $ML_4$ at 100° C. The spray compound was sprayed onto an area of soil at a rate of 1½ oz. of solids per square yard, on which soil a proprietary lawn seed mixture mixed with some sifted soil had been broadcast.

A similar area of soil sewn with the same seed/soil mixture was left untreated.

Both areas were given equal amounts of water from time to time. Germination of the grass was seen first with treated soil and subsequently grew longer blades.

*Example 2*

A spray compound of a similar composition to that used in Example 1 was sprayed onto sand at the rate of 3 oz. of solids per square yard and was laid to dry for three days. The sand was then subjected to artificial rain equivalent to 2 inches per hour for a quarter of an hour. Whereas untreated sand was washed about by the artificial rain, the oil/rubber film retained the surface of treated sand in its original condition.

*Example 3*

A compound of a latex of Intol 1570 rubber and dark aromatic oil (containing 100 parts dry weight rubber and 100 parts oil) was sprayed on the surface of a heap of flue-ash at the rate of 4 oz. of solids per square yard of exposed surface. There was produced a continuous skin of oil/rubber which resisted the action of wind and rain from flowing and washing away the fine flue-ash dust.

The dark colour of the oil enabled the skin to be seen so that any sprayed areas could be detected easily.

*Example 4*

A thin skin or blanket impermeable to water was made on the surface of sand by applying an oil extended rubber latex of 20% solids concentration (containing 100 parts dry weight rubber and 200 parts oil) with a watering can.

*Example 5*

A thin skin or blanket impermeable to water was made on the rough surface of a heap of vegetable material covered with a layer of soil, as is done in preparing a compost heap by spraying from a watering can. The spray compound was of 25% solids content and contained 100 parts dry weight of rubber and 150 parts oil. The skin or blanket reduced evaporation of water from the heap and rotting of the vegetable material proceeded rapidly.

Example 6

Example 1 was repeated with the exception that the ratio by weight of the latex of Intol 1570 rubber to aromatic oil was 1:9. Similar results were obtained.

Example 7

Example 1 was repeated with the exception that the ratio by weight of the latex of Intol 1570 rubber to aromatic oil was 1:19. Similar results were obtained.

Example 8

Soil with a high proportion of silt and subject to crust formation after rain and subsequent drying was sprayed with a mixture of oil and rubber in the proportion of 300 parts oil to 100 parts of rubber expressed as dry weights.

The mixture was at a concentration of 30% with respect to non-aqueous matter and applied at the rate of ¼ imperial pint per sq. yard to the soil surface after a fine tilth had been prepared. Heavy rain-storms at the rate of 2 inches per hour within 2 weeks of application did not disturb the soil surface and the crumbs remained discrete. The rain water drained into the soil quickly but did not drain away on the untreated soil.

Example 9

A thin film of oil extended rubber was applied at the rate of ⅗ oz. non-aqueous matter per sq. yard from a suspension of 200 parts oil to 100 parts rubber at 5% concentration to an overcropped clay soil which had lost its structure and capped badly. The germination of pea and beet seedlings was markedly improved on the treated areas. After tilling the soil an improved structure could be demonstrated.

Example 10

A field soil of chalk marl was sprayed with a latex described in Example 8 but with 1 part of dispersed carbon black added for each 100 parts of non-aqueous solids. Thermometers inserted into the ground below the film showed an increase of temperatures of 1–2° F. at 4 inches depth compared with untreated soil. Sugar beet plants in the soil showed improved growth where the black film had been applied.

Example 11

A plot of sloping soil with a naturally formed crust was sprayed with a compound containing 25% concentration of material made up of 5 parts of oil to 1 part of rubber.

In this example the oil emulsion was prepared as described for the other examples but the oil used was an oil sold by B. P. Company having a sp. gravity at 60° F. of 0.997, a kinematic viscosity at 100° F. of 137 cs., a refractive index of 1.56, a total acidity of 1.1, a colour index of 8 A.S.T.M., and an aromatic content of 75%. 2 oz. of dry matter were applied per sq. yard. In a light rainfall the run-off of untreated soil was increased from 30% to 70% of the measured rainfall.

Under laboratory conditions a drop of water placed on the untreated crust soaked into the crust in 30 seconds. Where a film had been sprayed the drop remained on the surface for 3 hours.

Example 12

A blend of oil and rubber in emulsion form and in proportions of oil: 1 rubber was mixed with a solution of a quaternary ammonium selective weed-killer. The same damage to weeds was caused by the weed-killer containing latex compound as when weed-killer alone was used.

Example 13

A compound containing oil and rubber in equal parts was sprayed on the sides and bottom of a gully at the rate of 8 oz. of solids per square yard from a concentrated spray compound. When allowed to dry the latex provided a waterproof channel with stabilised sides which was an efficient conduit for water.

What I claim is:
1. A process of stabilizing the soil particles of croplands and preventing the erosion thereof, comprising applying to the surface layer of said soil particles a film of an aqueous dispersion of oil extended rubber, wherein the ratio of oil to rubber in parts by weight is 1–10 parts of oil to 1 part of rubber, applied at a rate of between about 20 and about 150 grams of solids per square meter of soil surface, and wherein the solid contents of said dispersion are in a range from about 5 to about 30 percent by weight.

2. The process according to claim 1 wherein the ratio of oil to rubber in parts by weight is 9:1.

3. The process according to claim 1 wherein said dispersion of oil extended rubber is applied at a rate of about 40 to 50 grams of solids per square meter of soil surface.

4. The process according to claim 1 wherein said dispersion of oil extended rubber is formed from a mixture of a rubber latex and an oil emulsion.

5. The process according to claim 1 wherein the oil component of the oil extended rubber predominantly is selected from the class comprising mineral oil, aromatic oil and napthenic oil.

6. The process according to claim 1 wherein the rubber component of said oil extended rubber is a copolymer of butadiene and styrene.

References Cited by the Examiner

UNITED STATES PATENTS

| | | | |
|---|---|---|---|
| 1,882,377 | 10/1932 | Whittelsey | 47—9 |
| 2,961,799 | 11/1960 | Coe | 47—9 |
| 2,978,427 | 4/1961 | Pullar et al. | 260—28.5 |

ABRAHAM G. STONE, *Primary Examiner.*

ROBERT E. BAGWILL, *Examiner.*